United States Patent
Garbow et al.

(10) Patent No.: US 8,022,948 B2
(45) Date of Patent: Sep. 20, 2011

(54) IMAGE CAPTURE AND BUFFERING IN A VIRTUAL WORLD USING SITUATIONAL MEASUREMENT AVERAGES

(75) Inventors: Zachary A. Garbow, Rochester, MN (US); Jim C. Chen, Rochester, MN (US); Ryan K. Cradick, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 12/181,679

(22) Filed: Jul. 29, 2008

(65) Prior Publication Data
US 2010/0026715 A1 Feb. 4, 2010

(51) Int. Cl.
*G06T 15/00* (2011.01)
(52) U.S. Cl. ....................................................... 345/419
(58) Field of Classification Search .......... 345/418–426, 345/632, 633
See application file for complete search history.

(56) References Cited

U.S. PATENT DOCUMENTS

| | | | | |
|---|---|---|---|---|
| 6,405,062 | B1 * | 6/2002 | Izaki | 455/573 |
| 7,446,772 | B2 * | 11/2008 | Wong et al. | 345/473 |
| 2003/0038805 | A1 * | 2/2003 | Wong et al. | 345/473 |
| 2009/0066690 | A1 * | 3/2009 | Harrison | 345/419 |

OTHER PUBLICATIONS

U.S. Patent Application entitled, "Image Capture and Buffering in a Virtual World."

* cited by examiner

*Primary Examiner* — Ryan R Yang
(74) *Attorney, Agent, or Firm* — Patterson & Sheridan, LLP

(57) ABSTRACT

A technique is disclosed for detecting photo opportunities within a virtual environment. In response to detecting a photo opportunity, images of the virtual environment may be captured from perspectives not limited to the user's viewport. A variety of physiological and virtual world parameters are measured to determine when to capture an image of a user interacting with the virtual environment. To improve the quality of images, these parameters may be individually weighted by factors specified by the user. Captured images may be stored in a temporary buffer space, possibly replacing older images. The user may view the buffer contents and select ideal images to move to a permanent gallery. The user's image selections can in turn be used to further improve the quality of future images.

21 Claims, 7 Drawing Sheets

IMAGE CAPTURE AND BUFFERING IN A VIRTUAL WORLD USING SITUATIONAL MEASUREMENT AVERAGES

BACKGROUND OF THE INVENTION

1. Field of the Invention

Embodiments of the invention relate to the use of immersive visual environments. More specifically, embodiments of the invention relate to techniques for identifying photo opportunities and capturing images of events occurring within a virtual world.

2. Description of the Related Art

A virtual world is a simulated environment which users may inhabit and interact with virtual objects and locations of the virtual world. Users may also interact with one another via avatars. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available, and where events continue to occur, regardless of the presence of a given avatar. Thus, unlike more conventional online games or multi-user environments, the virtual world continues to exist, and plots and events continue to unfold as users enter (and exit) the virtual world. Virtual environments are presented as images on a display screen and some virtual environment may allow users to record events that occur within the virtual environment.

SUMMARY OF INVENTION

One embodiment of the invention includes a method for automatically capturing images in a virtual world. The method may generally include collecting one or more sets of real-time situational measurements from the virtual world. Each real-time situational measurements relates to one of a state of the virtual world or a user interacting with the virtual world. The method may also include maintaining a database of situational measurement averages and also includes comparing a current set of real-time situational measurements to the averages so as to compute individual measurement deviations and a cumulative deviation score. The method may further include capturing, from perspectives not confined to a user viewport, at least one image and its associated perspective and situational measurements, if the cumulative deviation score exceeds a predefined photo opportunity threshold.

Still another embodiment of the invention includes a computer-readable storage medium containing a program which, when executed, performs an operation for automatically capturing images in a virtual world. The operation may generally include collecting one or more sets of real-time situational measurements from the virtual world. Each real-time situational measurements relates to one of a state of the virtual world or a user interacting with the virtual world. The operation may also include maintaining a database of situational measurement averages and also includes comparing a current set of real-time situational measurements to the averages so as to compute individual measurement deviations and a cumulative deviation score. The operation may also include capturing, from perspectives not confined to a user viewport, at least one image and its associated perspective and situational measurements, if the cumulative deviation score exceeds a predefined photo opportunity threshold.

Still another embodiment of the invention includes a system having a processor and a memory containing a program, which when executed by the processor is configured to perform an operation for automatically capturing images in a virtual world. The program may be generally configured to collect one or more sets of real-time situational measurements from the virtual world. Each real-time situational measurement may relate to one of a state of the virtual world or a user interacting with the virtual world. The program may be further configured to maintain a database of situational measurement averages and to compare a current set of real-time situational measurements to the averages so as to compute individual measurement deviations and a cumulative deviation score. The program may be further configured to capture, from perspectives not confined to a user viewport, at least one image and its associated perspective and situational measurements, if the cumulative deviation score exceeds a predefined photo opportunity threshold.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
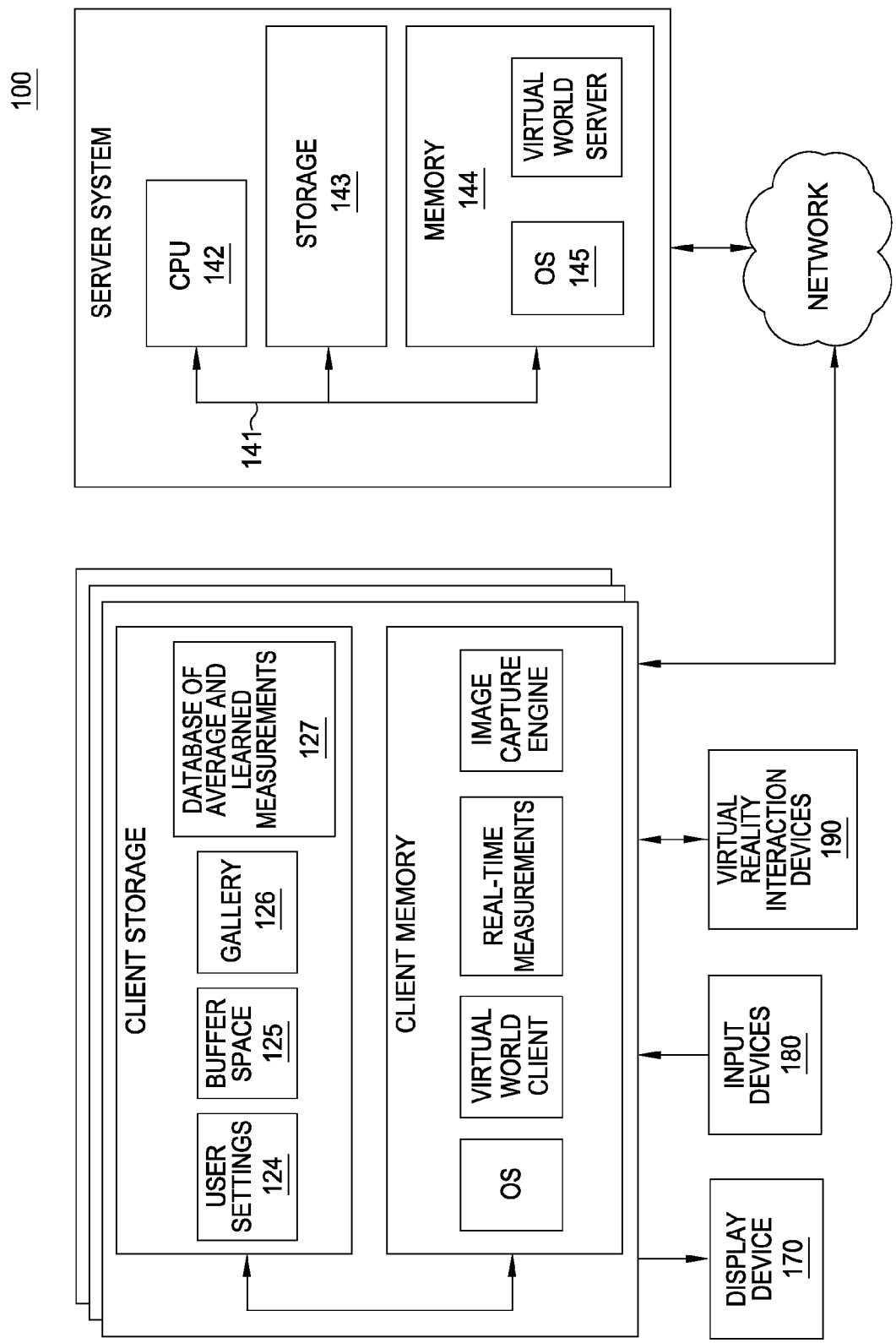
FIG. 1 is a block diagram that illustrates a client server view of a virtual world computing environment, according to one embodiment of the invention.

A virtual world provides a simulated environment where users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach and interact with another avatar by communicating, performing commercial transactions, engaging in recreational activities, and the like. Thus, multiple users, although in different physical locations, may be present in the same virtual location and interact with one another using their respective avatars.

In a virtual world, like in the real world, it is often desirable to capture moments and memories into pictures. Just like in the real world, many interactions in a virtual world may provide a potential "photo opportunity." For instance, a user may be at a party with friends or on a virtual vacation. While it is rather trivial to take a screenshot, a user may not realize that a photo opportunity has occurred until the moment has passed. Additionally, a screenshot only captures a single camera angle; namely, that of the user's viewport, which may not result in an image the user wants.

Although the user may be able to record their entire interaction with the virtual world and select individual images to save, this approach creates a video where the images would follow a path of the camera through the environment, and further, requires substantial storage space. Additionally, few users would want to wade through such a staggering number of pictures. As such, users may wish to automatically identify and save images at opportune moments while they interact with a virtual environment.

Embodiments of the invention provide techniques for detecting good photo opportunities that may occur within a virtual environment, and, in response, capturing images from perspectives not limited to the user's viewport. In one embodiment, a variety of physiological and virtual world parameters are measured to determine when to capture an image of a user interacting with the virtual environment. To improve the quality of images, these parameters may be individually weighted by factors specified by the user. In another embodiment, captured images are stored into a temporary buffer space of a fixed size, possibly replacing older images. The user may view the buffer contents and select ideal images to move to a permanent gallery. The user's image selections can in turn be used to further improve the quality of future images.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of a virtual world computing environment 100, according to one embodiment of the invention. As shown, virtual world computing environment 100 includes client computers 120, a network 160, and a server system 140. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 120 includes a central processing unit (CPU) 122, which obtains instructions and data via a bus 121 from a client memory 130 and client storage 123. CPU 122 is a programmable logic device that performs all the instruction, logic, and mathematical processing in a computer. Client storage 123 stores application programs and data for use by client computer 120. Client storage 123 includes hard-disk drives, flash memory devices, optical media and the like. Client computer 120 is operably connected to the network 160. Client memory 130 includes an operating system (OS) 131 and a virtual world client 132. Operating system 131 is the software used for managing the operation of the client computer 120. Examples of OS 131 include UNIX, a version of the Microsoft Windows® operating system, and distributions of the Linux® operating system. (Note: Linux is a trademark of Linus Torvalds in the United States and other countries.)

In one embodiment, the virtual world client 132 provides a software program that allows a user to connect to a virtual world server application 146 on the server 140, and once connected, to perform various user actions. Such actions may include exploring virtual locations, interacting with other avatars, and interacting with virtual objects. Further, the virtual world client 132 may be configured to generate and display a visual representation of the user within the immersive environment, generally referred to as an avatar. The avatar of the user is generally visible to other users in the virtual world, and the user may view avatars representing the other users. The virtual world client 132 may also be configured to generate and display the immersive environment to the user and to transmit the user's desired actions to the virtual world server 146. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

As shown, client memory 130 also includes an image capture engine 134. In one embodiment, the image capture engine 134 may provide a software application configured to detect photo opportunities and, in response, to capture images of the virtual environment at an opportune moment. The image may capture an image of the user's avatar or an image of what the avatar "sees" at the opportune moment. That is, the camera perspective is not limited to the user's viewport. Further, in one embodiment, the image capture engine 134 may capture three-dimensional scene data describing each object depicted in the virtual environment at an opportune moment. Doing so may allow two-dimensional images of a given moment in the virtual world to be created from any desired perspective. Once captured, the images may be stored in a temporary buffer space 125. In one embodiment, the size of the buffer may be adjusted by the user. To select when an opportune moment may have occurred (or about to occur), the image capture engine 134 may extract real-time measurements 133 from the virtual world client 132. These real-time measurements include any measurable physiological or virtual world parameter. This can include, e.g., changes in the vicinity of the user's avatar within the virtual world, as exposed by the virtual world server 146 to the virtual world client 132. For example, assume that the user is hanging out with friends in the virtual world when fireworks suddenly light up the evening sky, causing the users to adjust their view of the virtual world to all focus on relatively the same place. The real-time measurements may also include, e.g., physiological parameters measured through input devices 180 and virtual reality interaction devices 190. Continuing the example, the user may laugh into a microphone upon seeing the fireworks in the virtual world. Other examples of measurable physiological parameters include pulse, eye movement, brain activity, body temperature, pressure of grip on mouse, movement pattern of mouse, typing speed and pattern, typing pressure, facial features, perspiration, and head movement.

In one embodiment, the image capture engine 134 may be configured to maintain a database 127 of average measurements used to detect whether a photo opportunity has occurred. The real-time measurements of a given parameter may be evaluated against historical averages to determine whether a photo opportunity has occurred. For example, if a group of users are speaking to one another, an average volume of speech may be sampled and, if one user raises their voices above a specified threshold, then the image capture engine 134 may capture an image and store it in buffer space 125. In one embodiment, the specified threshold can be weighted according to a user-specified weighting factor and stored as part of user settings 124.

Further, learned measurements may be acquired by providing the user with the ability to select images from the buffer 125 to move to a permanent gallery 126. When an image is moved to the permanent gallery 126, a set of situational measurements may be stored in the measurements database 127. For example, if the user has a history of selecting images be taken when microphone laughter was abundantly present, the image capture engine 134 may respond by increasing a weighting factor associated with a microphone laughter measurement. Similarly, if the user has a history of selecting images taken from a certain angle and distance, the image capture engine 132 may favor capturing images from similar or identical angles and distances.

The user may view the virtual world using a display device 170, such as an LCD or CRT monitor display. And the user may interact with the virtual world client 132 using input devices 180, e.g., a keyboard and mouse. Further, in one embodiment, the user may interact with the virtual world client 132 and the virtual world server 146 using a variety of virtual reality interaction devices 190. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement, motion, or other actions of the user into actions performed by the avatar representing that user within the virtual world.

As shown, the server system 140 includes a CPU 142, which obtains instructions and data via a bus 141 from memory 144 and storage 143. The processor 142 could be any processor adapted to support the methods of the invention. The memory 144 is any memory sufficiently large to hold the necessary programs and data structures. Memory 144 could be one or a combination of memory devices, including Random Access Memory, nonvolatile or backup memory (e.g., programmable or Flash memories, read-only memories, etc.). In addition, memory 144 and storage 143 may be considered to include memory physically located elsewhere in a server 140, for example, on another computer coupled to the server 140 via bus 141. The server system 140 may be operably connected to the network 160, which generally represents any kind of data communications network. Accordingly, the network 160 may represent both local and wide area networks, including the Internet.

Of course, the embodiments described herein are intended to be illustrative and not limiting of the invention. And other embodiments are broadly contemplated. For example, the image capture engine 134, user settings 124, buffer space 125, gallery 126, and database of average and learned measurements 127 need not reside on the client as they are shown to in FIG. 1, and any or all of them may reside instead on the server system 140. In another example, the functionality of the image capture engine 134 may be incorporated into the virtual world client 132.

Figure 2A:
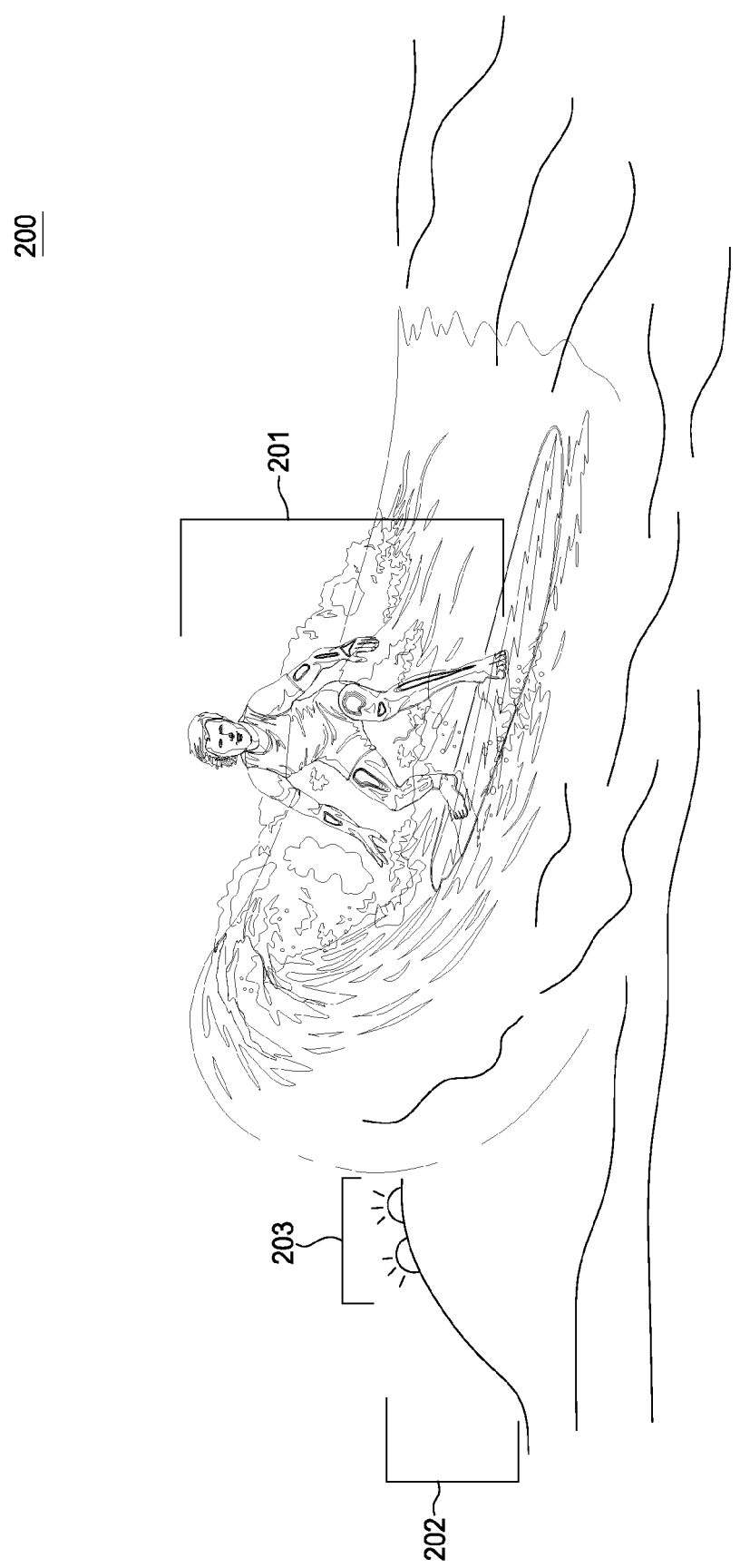
FIG. 2A illustrates a user participating in a virtual world, shown from a third-person perspective of the user, according to one embodiment of the invention.

FIG. 2A illustrates a user display 200 showing a viewport presented to a user interacting with a virtual world using a third-person perspective of the user, according to one embodiment of the invention. In this example, the primary user (i.e., the user viewing the user display 200) is represented by avatar 201 and has just caught a wave 202 while surfing with a first and second avatar 203. Further, the viewport shows the avatar 201 from behind, on the crest of the wave 202 with two avatars 203 further away, partially occluded by the wave. In this example, assume that the two avatars 203 are controlled by users that are friends with the primary user. Situations like the one depicted in FIG. 2A present a narrow window of opportunity for a capturing a memorable image of these avatars interacting with one another in the virtual environment. As shown in FIG. 2A, the primary user controlling the avatar 201 may not realize the opportunity until it is too late. In addition, even if the primary user were to capture a screenshot, the viewport shows only the back of the primary user's avatar 201, the clipped heads of the two avatars 203, and the backside of the wave 202, leading to a less than ideal screenshot.

Figure 2B:
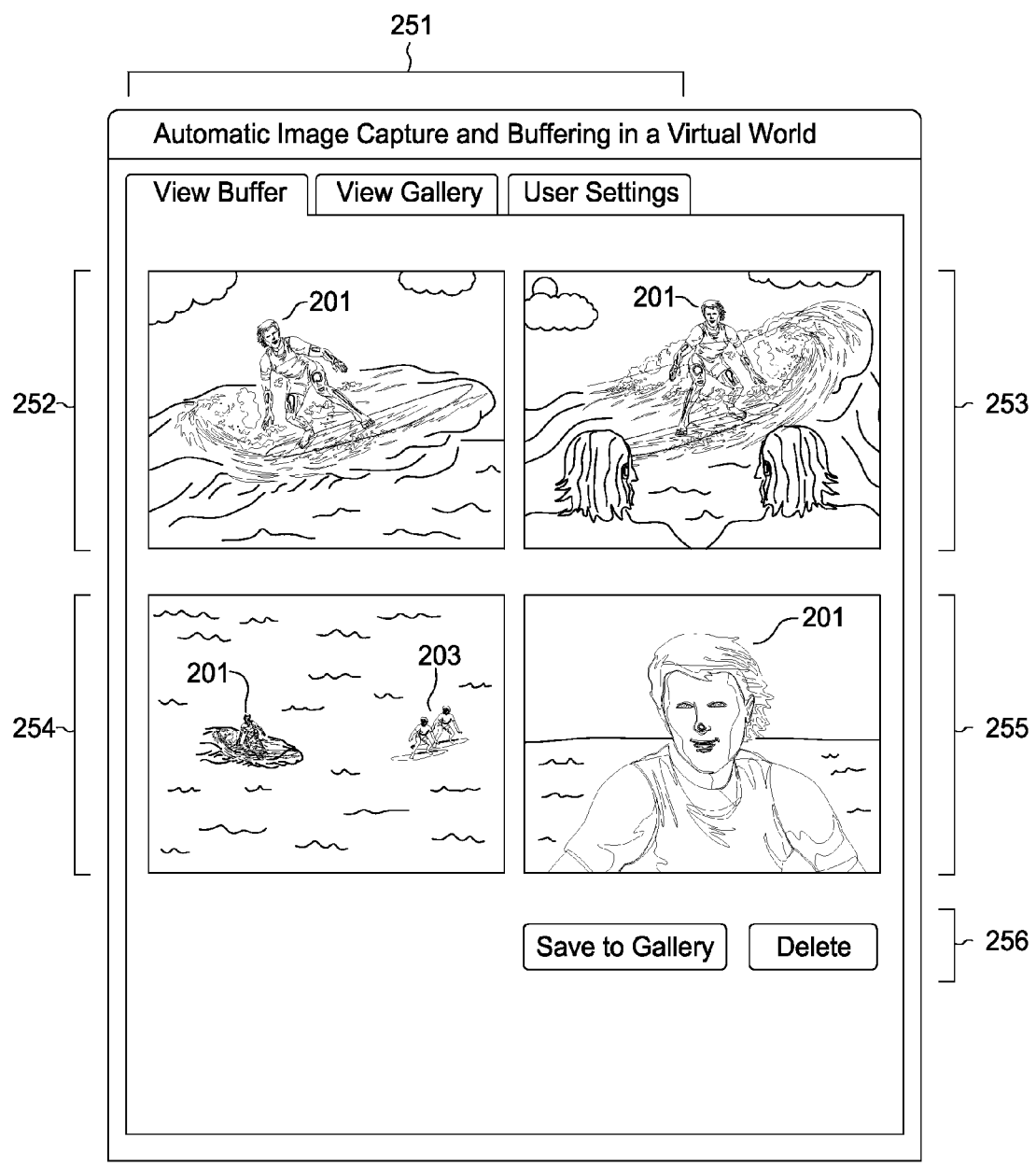
FIG. 2B illustrates a graphical user interface screen showing contents of an image buffer, according to one embodiment of the invention.

FIG. 2B illustrates a graphical user interface 250 for viewing the contents of the buffer 125, according to one embodiment of the invention. Illustratively, interface 250 shows images of the situation depicted in FIG. 2A. In this example, assume the images in FIG. 2B were taken by image capture engine 134 of the display 200 at a point where an photo opportunity score exceeded a specified threshold. More specifically, the images may have been taken when a cumulative deviation of a set of measurements exceeded a specified threshold as a result of the proximity of the avatar 201 and the two avatars 203, the user's avatar smiling upon catching the wave 202, the two avatars 203 smiling at the avatar 201, and the level of microphone laughter. Of course, the particular measurements and the threshold may be tailored to suit the preferences of a given user.

Illustratively, the four images shown in FIG. 2B include a side view 252 that shows the shape of the nice wave along with the avatar's poise, a front view 253 that shows the emotional expressions on all three avatars, an aerial view 254 that reveals the surrounding waters, and a portrait view 255 that captures an expression on the face of the avatar 201. Because the image capture engine 134 captured images 252, 256, 254, and 255 from a variety of angles, these images may provide the primary user with a much better remembrance of this event within the virtual world than the hastily captured screenshot shown in FIG. 2A. Further, the primary user (i.e., the user controlling the avatar 201) may select one of operations 256 such as saving one of these four images into a permanent gallery 126 (accessible via a tab selection 251) or deleting an unwanted image from the buffer 125, freeing additional space for images captured by the image capture engine 134.

Figure 3:
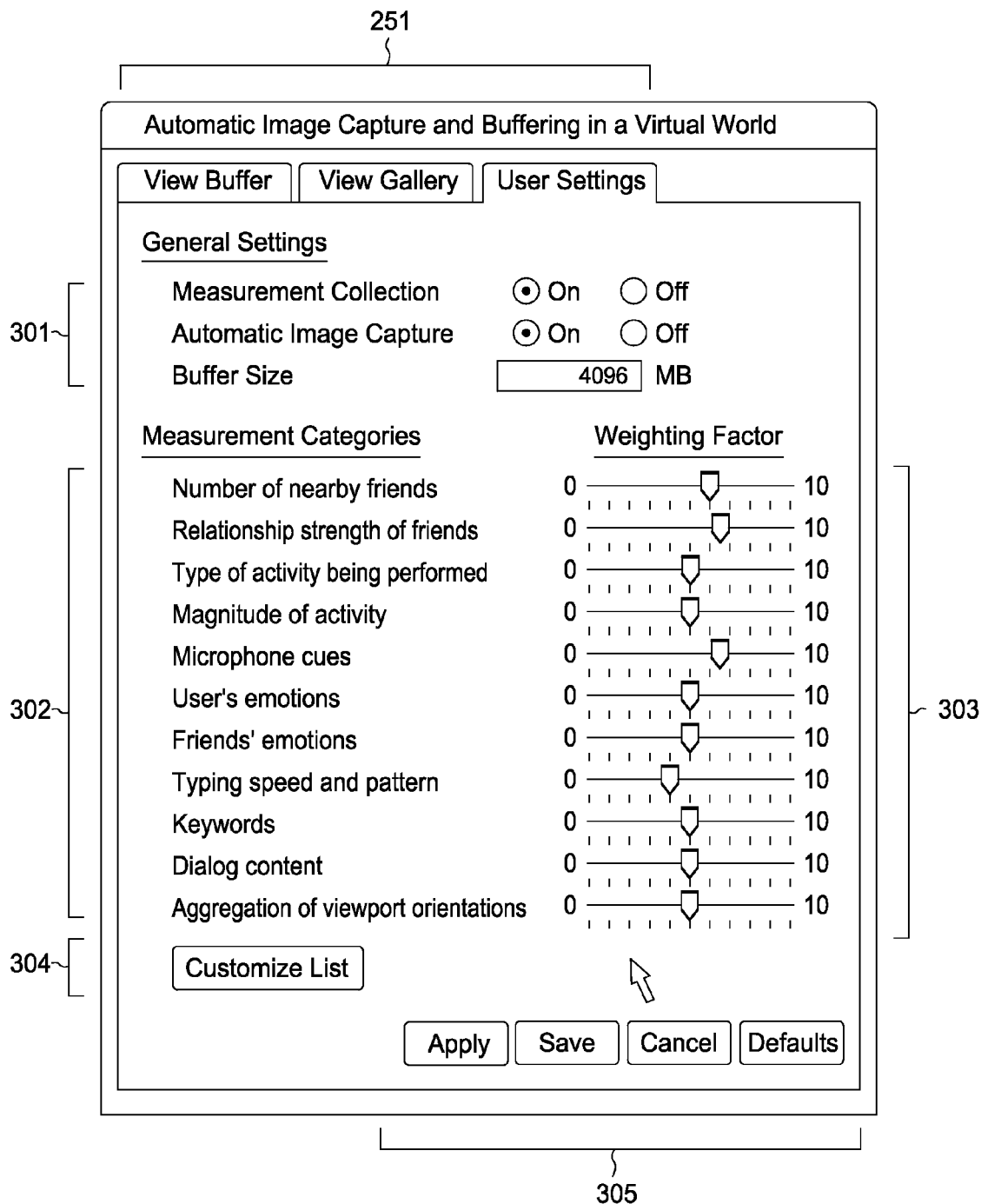
FIG. 3 illustrates a graphical user interface screen displaying configuration options, according to one embodiment of the invention.

FIG. 3 illustrates a graphical user interface 300 for configuring the user settings 124 of the image capture engine 134, according to one embodiment of the invention. As shown, a set of general settings 301 may be used to specify a desired buffer size for storing images captured automatically on behalf of a user, as well as to activate or deactivate measurement collection and automatic image capture.

In one embodiment, a user may also customize a set of weighting factors 303 associated with a list of measurement categories 302. Illustratively, a set of slider bars may be used to increase (or decrease) the weighting given to any particular factor. As shown, the weighting factors 303 range in value from 0 to 10, according no effect and maximum effect, respectively, to the associated measurement category. In this example, the list of displayed measurement categories 302 include number of nearby friends, relationship strength of friends, type of activity being performed (e.g., is the user skydiving for the first time?), magnitude of activity, microphone cues, "emoticons" included in instant message communications, "emoticons" received in instant message communications, typing speed and patterns, keywords (e.g., "this is fun/funny", "LOL"), verbal dialogue content, and aggregation of viewport orientations (e.g., are a large number of users looking at the same person or object?). The particular measurement categories displayed to a user can be customized by clicking on a button 304. Of course, one of skill in the art will recognize that the measurement categories may be tailored to include any measurable physiological or virtual world parameter (for example, the magnitude of scene change in the user's viewport, etc.). A set of buttons 305 allow the user to apply, save, or cancel the changes, or restore the default settings.

Figure 4:
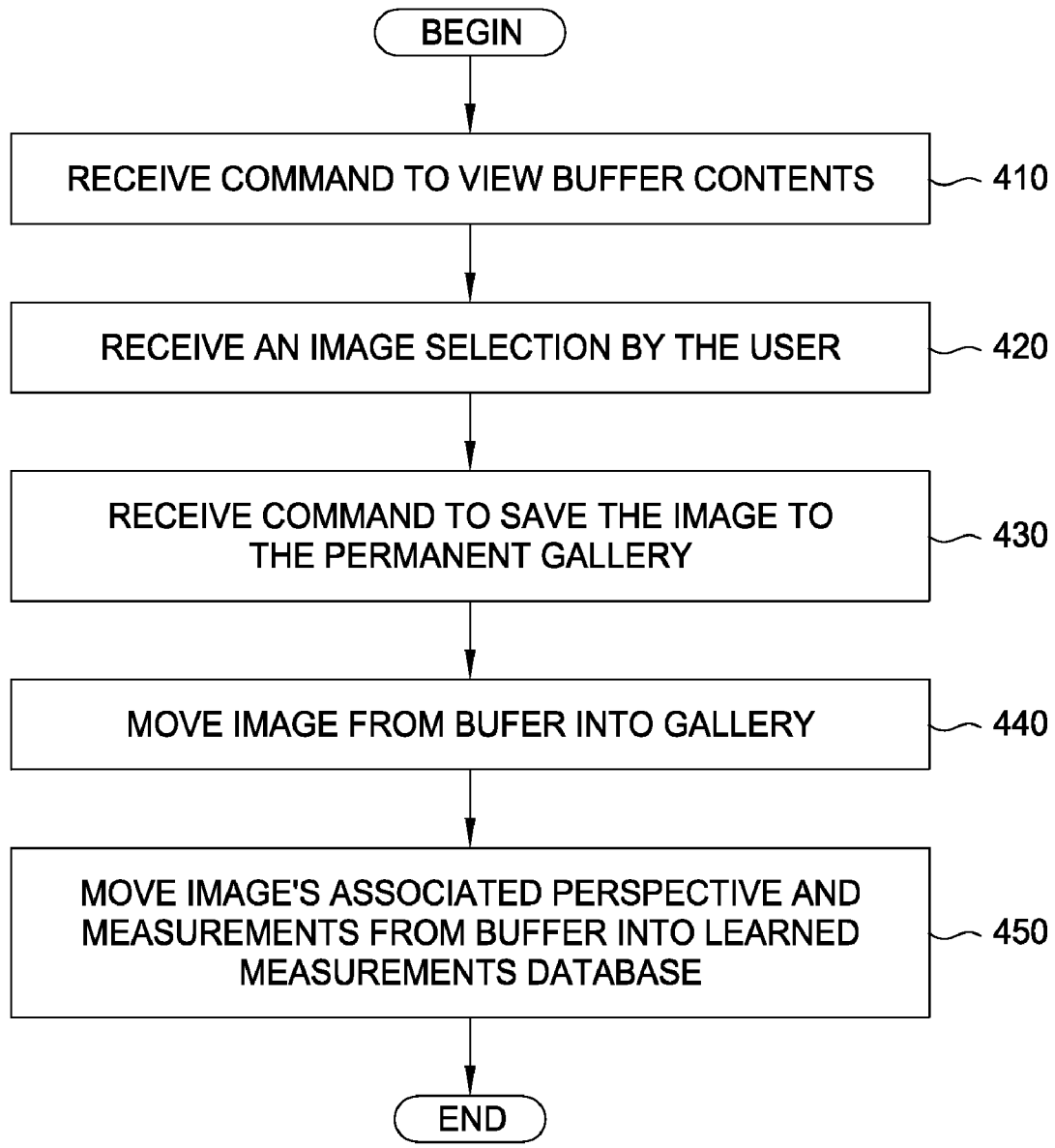
FIG. 4 is a flow diagram illustrating a method for improving the quality of images captured on behalf of a user in a virtual environment, according to one embodiment of the invention.

FIG. 4 is a flow diagram illustrating a method 400 for improving the selection of images captured on behalf of a user in a virtual environment, according to one embodiment of the invention. More specifically, FIG. 4 illustrates a method for learning a user's preferred perspectives and situational measurements used to select images captured while the user interacts with elements of the virtual environment. For the sake of illustration, method 400 is described in conjunction with the system of FIG. 1. However, persons skilled in the art will understand that any system configured to perform the steps of the method 400, in any order, is within the scope of the present invention.

As shown, the method 400 begins at step 410, where a command to view the contents of the buffer for automatically captured images is received. For example, the user may click on a tab 251 for viewing the buffer 125. At step 420, the user may specify a selection of an image. For example, the user may select on an image 253 in the interface 250 of FIG. 2B. At step 430, the user may specify that the image selected at step 420 should be saved to a permanent gallery. For example, the user may click on a button 256 for saving a selected image 253 into the permanent gallery.

At step 440, the image capture engine 134 may move the selected image from the buffer 125 to the permanent gallery 126. For example, the selected image 253 is removed from the buffer and stored in the permanent gallery, which is accessible by clicking on the tab 251 for viewing the gallery contents.

At step 450, the image capture engine 134 may determine a set of perspective and/or situational measurements from the image moved to the permanent gallery. For example, the captured image could be tagged with metadata providing dimensional coordinates related to the virtual environment. In one embodiment, such a list could include at least eight 3D-coordinates relative to the location of the user's avatar, sufficient to represent the frustum shaped viewing volume representing the perspective from which an image was captured. In addition, the situational measurements may provide metadata describing aspects of the virtual environment when the image was captured. Using the image 253 of FIG. 2B as an example, the number of nearby friends was two, and the avatars representing the friends in the virtual environment were both looking at the avatar of the primary user. Of course, the situational metadata captured with an image may be tailored to suit the needs of a particular case. After step 450, the method 400 terminates.

Figure 5:
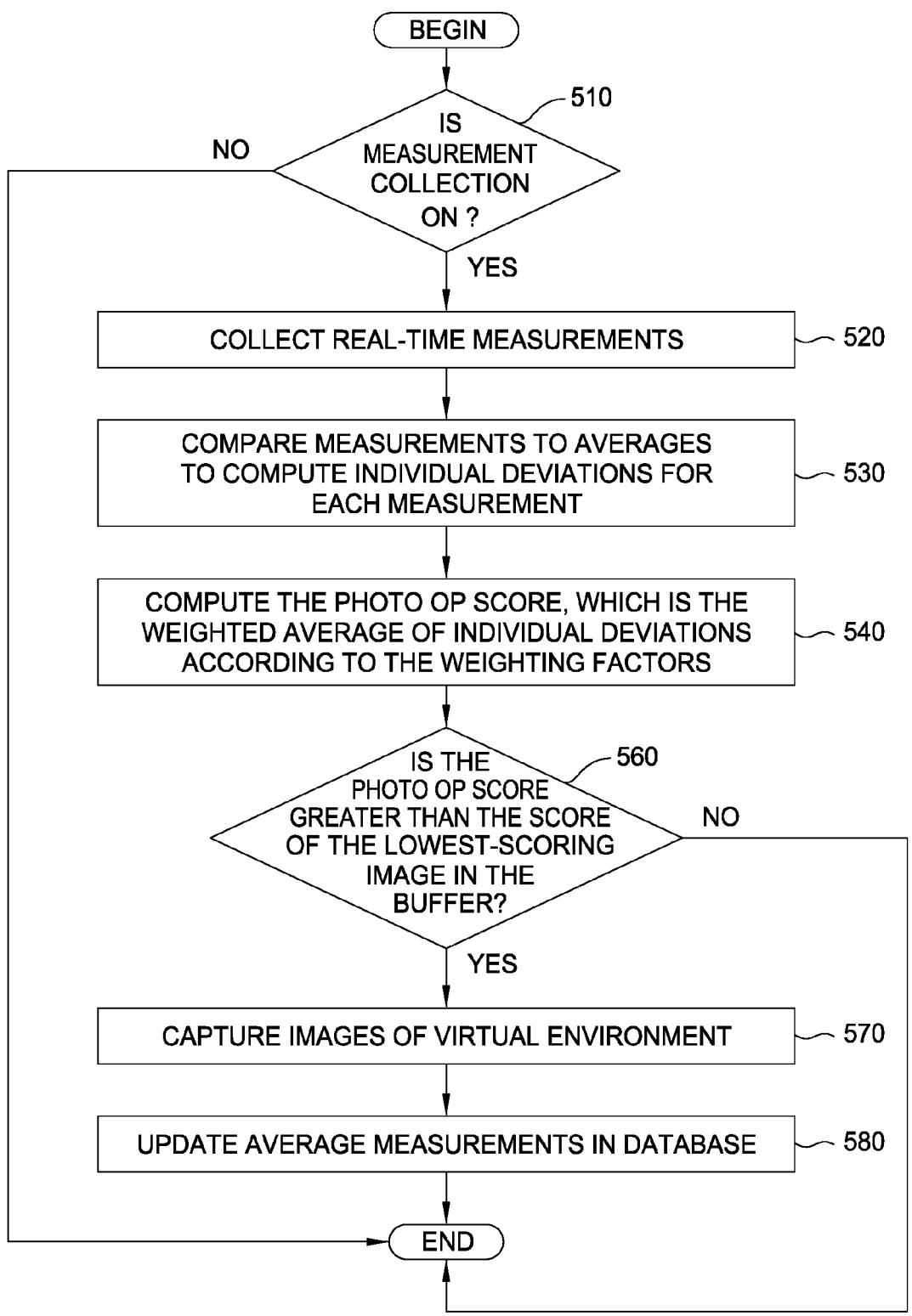
FIG. 5 is a flow diagram illustrating a method for identifying a photo opportunity within a virtual environment, based on user preferences, according to one embodiment of the invention.

FIG. 5 is a flow diagram illustrating a method 500 for determining a good photo opportunity, based on user preferences, according to one embodiment of the invention. For the sake of illustration, method 500 is described in conjunction with the system of FIG. 1. However, persons skilled in the art will understand that any system configured to perform the steps of the method 500, in any order, is within the scope of the present invention.

As shown, the method 500 begins at step 510, where the image capture engine 134 determines whether measurement collection is turned active. For example, as shown in FIG. 3, a radio button 301 allows the user to toggle whether measurement collection is active. If so, at step 520, real-time physiological and virtual world measurements may be collected. For example, the number of friends the user is with and the laughter level on the microphone, among other measurements, may be recorded. At step 530, the real-time measurements collected while a user interacts with the virtual environment may be compared to averages maintained in the database. The deviation from a current measurement and a historical average may be collected to identify when something interesting or unusual is occurring within the virtual environment. For example, as shown in FIGS. 2A and 2B, a primary user (represented by avatar 201) is interacting with two friends (represented by avatar 203). Assume for this example that this is more than one standard deviation from the average number of friends which the primary user typically interacts with in the virtual environment. Furthermore, assume that a laughter level on a microphone is more than 1.5 standard deviations from the average microphone laughter level.

At step 540, the individual deviations may be scaled using the weighting factors 303 and averaged to determine a weighted average of the individual deviations. The weighted average provides a cumulative deviation score which may be used to determine whether something interesting or unusual may be occurring within the virtual environment, i.e., a photo opportunity score. For example, assume the user specifies to give twice the weight to a deviation in a volume level or laughter picked up over a microphone than to a deviation in the number of friends the user is with in the virtual environment. In the present example, the cumulative deviation score based on the assumed deviations listed above, would be 1.33 standard deviations.

At step 550, the photo opportunity score determined in step 540 may be compared to a threshold score. In one embodiment, the threshold score is set to the score of lowest-scoring image in the buffer 125. That is, if the photo opportunity score exceeds the lowest score of any image in the buffer, then this may be an opportune moment to capture an image of the virtual environment. If the buffer is empty, then the threshold may be set to a minimum value (or simply 0.0). If the photo opportunity score is greater than the threshold score (step 560) the image capture engine 134 may capture a number of images of the virtual environment (step 570). At step 570, the real-time measurements collected in step 520 are used to update the average measurements in the database 126. At step 580, the method 500 terminates.

Of course, the embodiments described above are intended to be illustrative, and are not limiting of the invention. Other embodiments are broadly contemplated. For example, the comparison and computational steps 530 and 540 need not compute a weighted average as shown in FIG. 5 and may be replaced with any appropriate statistical computation. For instance, deltas in measurements can be monitored to predict an upcoming photo opportunity (e.g., if measurements begin to change rapidly). This approach may allow images to be captured in advance of an anticipated photo opportunity to ensure that images of opportune moments are not missed in quickly changing situations.

Figure 6:
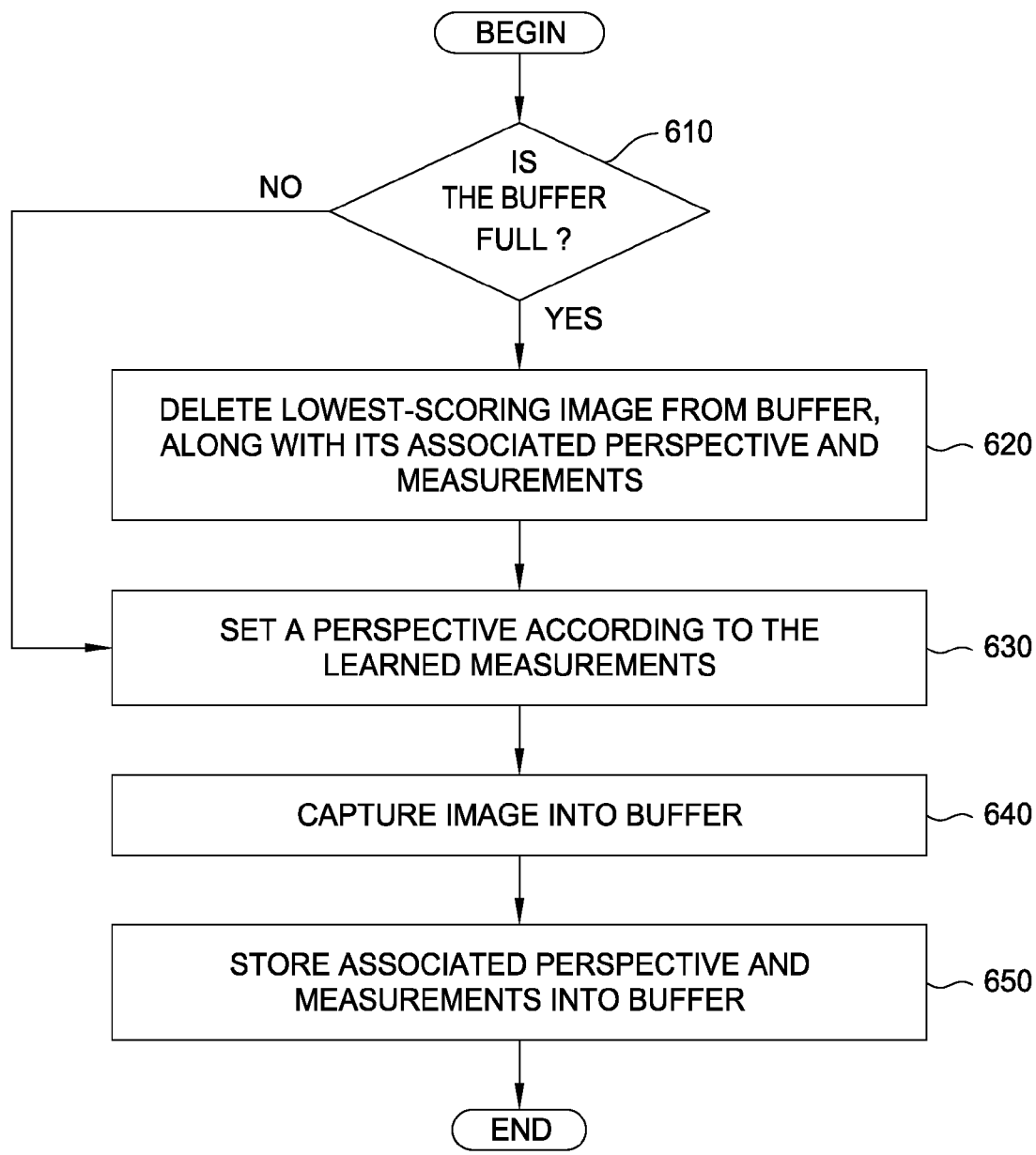
FIG. 6 is a flow diagram illustrating a method for capturing an image of a virtual environment, according to one embodiment of the invention.

FIG. 6 is a flow diagram illustrating a method 600 for capturing an image, according to one embodiment of the invention. For the sake of illustration, method 600 is described in conjunction with the system of FIG. 1. However, persons skilled in the art will understand that any system configured to perform the steps of the method 600, in any order, is within the scope of the present invention.

As shown, the method 600 begins at step 610, where the image capture engine 134 determines whether the buffer 125 is full. That is, whether the size of the buffer contents exceeds the user-specified maximum buffer size. At step 620, if the buffer is full, the image capture engine 134 deletes the lowest-scoring image from the buffer 125 to make room available for a new image. At step 630, a perspective, such as a side view or front view of the primary user's avatar from a suitable distance, is set and adjusted according to the learned measurements contained in the database 126. Alternatively, the image capture engine 134 may capture a collection of three-dimensional scene data describing each object depicted in the virtual environment. Doing so may allow a 3D image to be captured, or two-dimensional images to be created from any desired perspective. At step 640, an image is captured and stored in the buffer 125 from the perspective set in step 630. At step 650, measurements captured along with the image are stored into the buffer 125. For example, information related to situational metadata (e.g., how many avatars are present, what they are looking at, camera or viewport position, volume levels etc.). After step 650, the method 600 terminates.

While the foregoing is directed to embodiments of the present invention, other and further embodiments of the invention may be devised without departing from the basic scope thereof, and the scope thereof is determined by the claims that follow.

What is claimed is:

1. A method for automatically capturing images in a virtual world, comprising:
    collecting one or more sets of real-time situational measurements from the virtual world, wherein each real-time situational measurements relates to one of a state of the virtual world or a user interacting with the virtual world;
    maintaining a database of situational measurement averages;

comparing a current set of real-time situational measurements to the averages so as to compute individual measurement deviations and a cumulative deviation score; and capturing, from perspectives not confined to a user viewport, at least one image and its associated perspective and situational measurements, if the cumulative deviation score exceeds a predefined photo opportunity threshold.

2. The method of claim 1, wherein the computed cumulative deviation score scales each individual measurement deviation with a corresponding user-configurable weighting value.

3. The method of claim 1, further comprising allowing the user to select, from a buffer of user-specified size for storing automatically captured images, one or more images to be moved into a permanent gallery, wherein the associated perspective and situational measurements of images selected by the user may be used to adjust the weighting values and perspectives to improve future image quality.

4. The method of claim 3, wherein the photo opportunity threshold is the cumulative deviation score of the lowest-scoring buffer image, and wherein buffer image cumulative deviation scores may decline over time.

5. The method of claim 1, wherein the situational measurement averages include at least one of a number of nearby friends, a relationship strength of friends, a type of activity being performed, a magnitude of activity, microphone cues, characters used in an instant message exchange, a typing speed, a typing pattern, a keyword used in an instant message exchange, dialogue content, and an aggregation of viewport orientations.

6. The method of claim 1, wherein a plurality of images is captured, and wherein each image is captured from a distinct camera position.

7. The method of claim 1, further comprising:
receiving a selection of one of the captured images; and
copying the selected image to a permanent photo gallery.

8. A computer-readable storage medium containing a program which, when executed, performs an operation for automatically capturing images in a virtual world, the operation comprising:
collecting one or more sets of real-time situational measurements from the virtual world, wherein each real-time situational measurements relates to one of a state of the virtual world or a user interacting with the virtual world;
maintaining a database of situational measurement averages;
comparing a current set of real-time situational measurements to the averages so as to compute individual measurement deviations and a cumulative deviation score; and
capturing, from perspectives not confined to a user viewport, at least one image and its associated perspective and situational measurements, if the cumulative deviation score exceeds a predefined photo opportunity threshold.

9. The computer-readable storage medium of claim 8, wherein the computed cumulative deviation score scales each individual measurement deviation with a corresponding user-configurable weighting value.

10. The computer-readable storage medium of claim 8, wherein the operation further comprise, allowing the user to select, from a buffer of user-specified size for storing automatically captured images, one or more images to be moved into a permanent gallery, wherein the associated perspective and situational measurements of images selected by the user may be used to adjust the weighting values and perspectives to improve future image quality.

11. The computer-readable storage medium of claim 10, wherein the photo opportunity threshold is the cumulative deviation score of the lowest-scoring buffer image, and wherein buffer image cumulative deviation scores may decline over time.

12. The computer-readable storage medium of claim 8, wherein the situational measurement averages include at least one of a number of nearby friends, a relationship strength of friends, a type of activity being performed, a magnitude of activity, microphone cues, characters used in an instant message exchange, a typing speed, a typing pattern, a keyword used in an instant message exchange, dialogue content, and an aggregation of viewport orientations.

13. The computer-readable storage medium of claim 8, wherein a plurality of images is captured, and wherein each image is captured from a distinct camera position.

14. The computer-readable storage medium of claim 8, wherein the operation further comprises:
receiving a selection of one of the captured images; and
copying the selected image to a permanent photo gallery.

15. A system, comprising:
a processor; and
a memory containing a program, which when executed by the processor is configured to perform an operation for automatically capturing images in a virtual world, the operation comprising:
collecting one or more sets of real-time situational measurements from the virtual world, wherein each real-time situational measurements relates to one of a state of the virtual world or a user interacting with the virtual world,
maintaining a database of situational measurement averages,
comparing a current set of real-time situational measurements to the averages so as to compute individual measurement deviations and a cumulative deviation score, and
capturing, from perspectives not confined to a user viewport, at least one image and its associated perspective and situational measurements, if the cumulative deviation score exceeds a predefined photo opportunity threshold.

16. The system of claim 15, wherein the computed cumulative deviation score scales each individual measurement deviation with a corresponding user-configurable weighting value.

17. The system of claim 15, wherein the operation further comprise, allowing the user to select, from a buffer of user-specified size for storing automatically captured images, one or more images to be moved into a permanent gallery, wherein the associated perspective and situational measurements of images selected by the user may be used to adjust the weighting values and perspectives to improve future image quality.

18. The system of claim 17, wherein the photo opportunity threshold is the cumulative deviation score of the lowest-scoring buffer image, and wherein buffer image cumulative deviation scores may decline over time.

19. The system of claim 15, wherein the situational measurement averages include at least one of a number of nearby friends, a relationship strength of friends, a type of activity being performed, a magnitude of activity, microphone cues, characters used in an instant message exchange, a typing speed, a typing pattern, a keyword used in an instant message exchange, dialogue content, and an aggregation of viewport orientations.

20. The system of claim 15, wherein a plurality of images is captured, and wherein each image is captured from a distinct camera position.

21. The system of claim 15, wherein the operation further comprises:
receiving a selection of one of the captured images; and
copying the selected image to a permanent photo gallery.

* * * * *